July 8, 1924.  1,500,710
J. M. KELLY
LEVEL
Filed Nov. 5, 1921
Fig. 1.
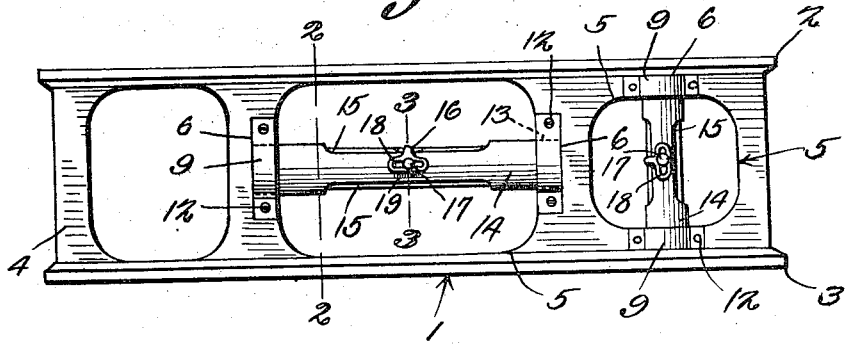
Fig. 2.
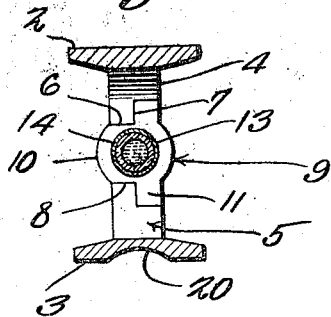
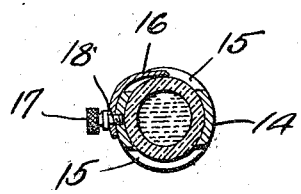
Fig. 3.
J. M. Kelly
Inventor,
By Knowles
Attorneys Patented July 8, 1924.

1,500,710

UNITED STATES PATENT OFFICE.

JAMES M. KELLY, OF PORTLAND, OREGON.

LEVEL.

Application filed November 5, 1921. Serial No. 513,127.

*To all whom it may concern:*

Be it known that I, JAMES M. KELLY, a citizen of the United States, residing at Portland, in the county of Multnomah and State of Oregon, have invented a new and useful Level, of which the following is a specification.

This invention relates to the construction of a spirit level and has for its object the provision of a level in which the spirit glasses are fixed with respect to the frame of the level, so that any adjustment of the spirit glasses is rendered impossible, thus preventing misadjustment of the level being made, either intentional or accidental.

Another object of the invention is the provision of an indicator used in conjunction with the level bubble to mark the center of the bubble when the instrument is level.

Still another object is the provision of means whereby a limited degree of inclination from a level position may be accurately laid off with the instrument.

Other objects will present themselves as the description proceeds, it being understood that within the scope of what is claimed, minor changes may be made in the device without departing from the spirit of the invention, or sacrificing any of the advantages thereof.

In the drawing—

Figure 1 is a view in elevation of a level constructed in accordance with the present invention.

Figure 2 is a transverse cross sectional view taken on line 2—2 of Figure 1.

Figure 3 is an enlarged detail sectional view, taken on line 3—3 of Figure 1.

Referring to the drawings by characters of reference, the numeral 1 designates a body comprising a head 2 and a foot 3, the two members being connected by a web 4. The web is formed with sight openings 5 in which to mount the level glasses. Seats 6 are formed in the web 4 at opposite sides of the openings 5, said seats defining shoulders 7 and a groove 8. Retaining blocks 9 are accurately fitted to the seats 6, the same having a body portion 10 adapted to enter the groove 8 and arms 11 which rest on the shoulders 7 being secured thereto by means of screws 12. The body 10 is provided with a socket 13 which receives the end of a tube 14, the level glass being mounted in said tube. The tube 14 has sight openings 15 through which the air bubble may be observed.

An indicator finger 16 is secured to the tube 14 by means of a set screw 17, the screw passing through an elongated slot 18 formed in one end of the finger 16. Graduations 19 on the tube 14 provide means whereby the finger 16 may be adjusted to mark, by comparison with the bubble, not only the level position of the device, but also a limited amount of inclination from a level, or from a perpendicular.

The head 2 of the level is formed with a plane surface, whereas the foot 3 has a longitudinal groove 20, the same being advantageous in using the spirit level in plumbing window and door casings having half round nosing.

It is to be observed that the spirit glasses are accurately ground and seated in the tubes 14, that the blocks 9 are fitted to the seats 6, so that it is impossible for the level glasses to get out of adjustment. Furthermore in case of breakage of a glass a new one may be readily inserted, and will be in proper position, with respect to the body of the level, without further adjustment.

It will also be noted that in using the level, either of the members 2 or 3 may be used as the base of the level.

Having thus described the invention, what is claimed is:—

A level comprising an I-shaped body portion having an opening through the central part of its web, there being shouldered recesses formed in said web at opposite ends of said opening, respectively, a tube having a sight opening intermediate its ends, a spirit glass positioned in said tube to be viewed through the sight opening, blocks slidingly fitting the ends of the tube and having reduced tongues shaped to seat in the shouldered recesses respectively whereby said tube and blocks may be laterally withdrawn from said recesses, and fastening elements rigidly securing said blocks to said body portion.

In testimony that I claim the foregoing as my own, I have hereto affixed my signature in the presence of two witnesses.

JAMES M. KELLY.

Witnesses:
 W. P. CHOATE,
 C. W. McCARTY.